Oct. 3, 1950     R. F. MOSS ET AL     2,524,466
SELF-PROPELLED TWO-WHEEL TIMBER-SAWING MACHINE
Filed Sept. 23, 1946     4 Sheets-Sheet 1
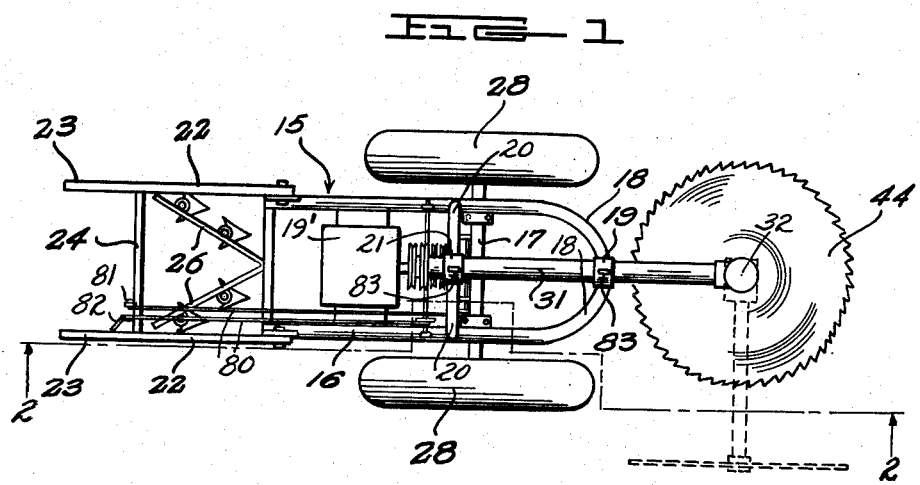
FIG. 1
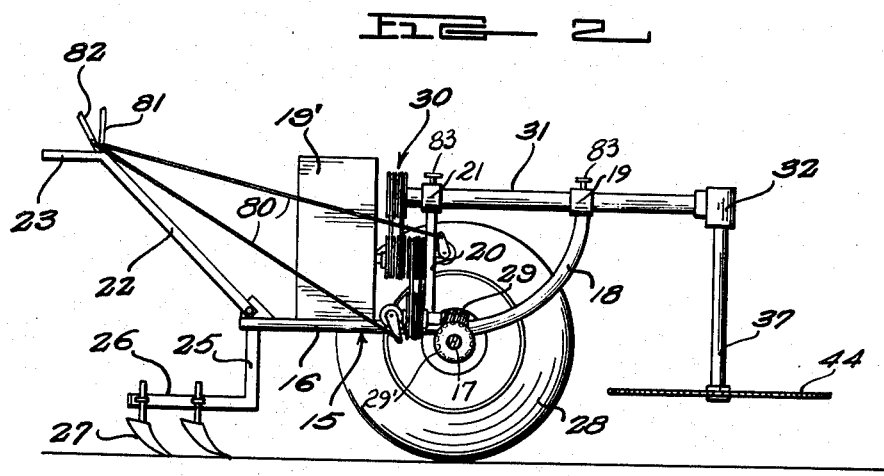
FIG. 2
FIG. 3
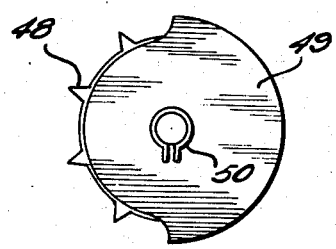
Inventors
RAYMOND F. MOSS
FLOYD J. MILLER
By *Clarence A. O'Brien*
*and Harvey B. Jacobson*
Attorneys Oct. 3, 1950     R. F. MOSS ET AL     2,524,466
SELF-PROPELLED TWO-WHEEL TIMBER-SAWING MACHINE
Filed Sept. 23, 1946     4 Sheets-Sheet 2
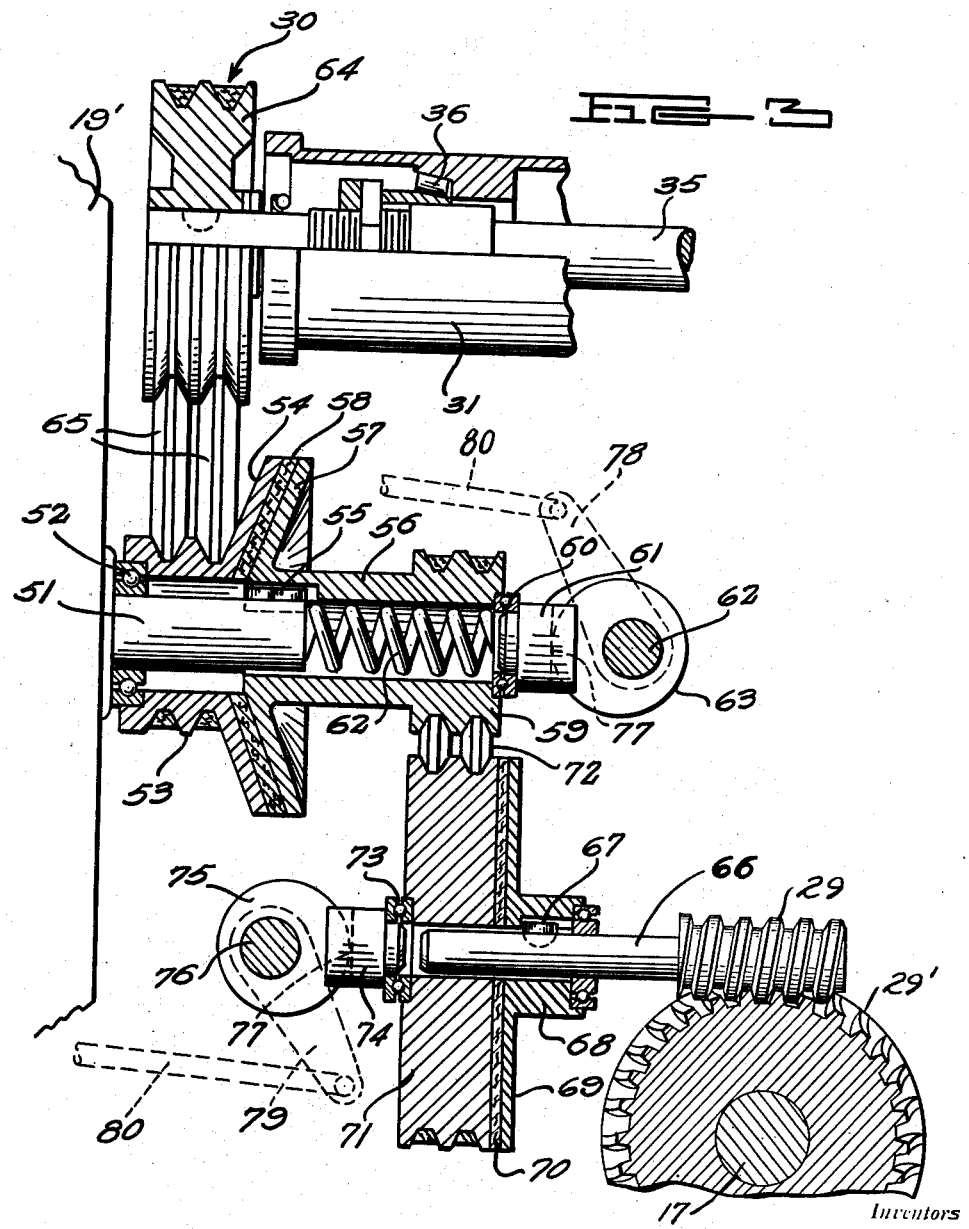
Inventors
Raymond F. Moss
Floyd J. Miller
By Clarence A. O'Brien
and Harvey B. Jacobson
Attorneys

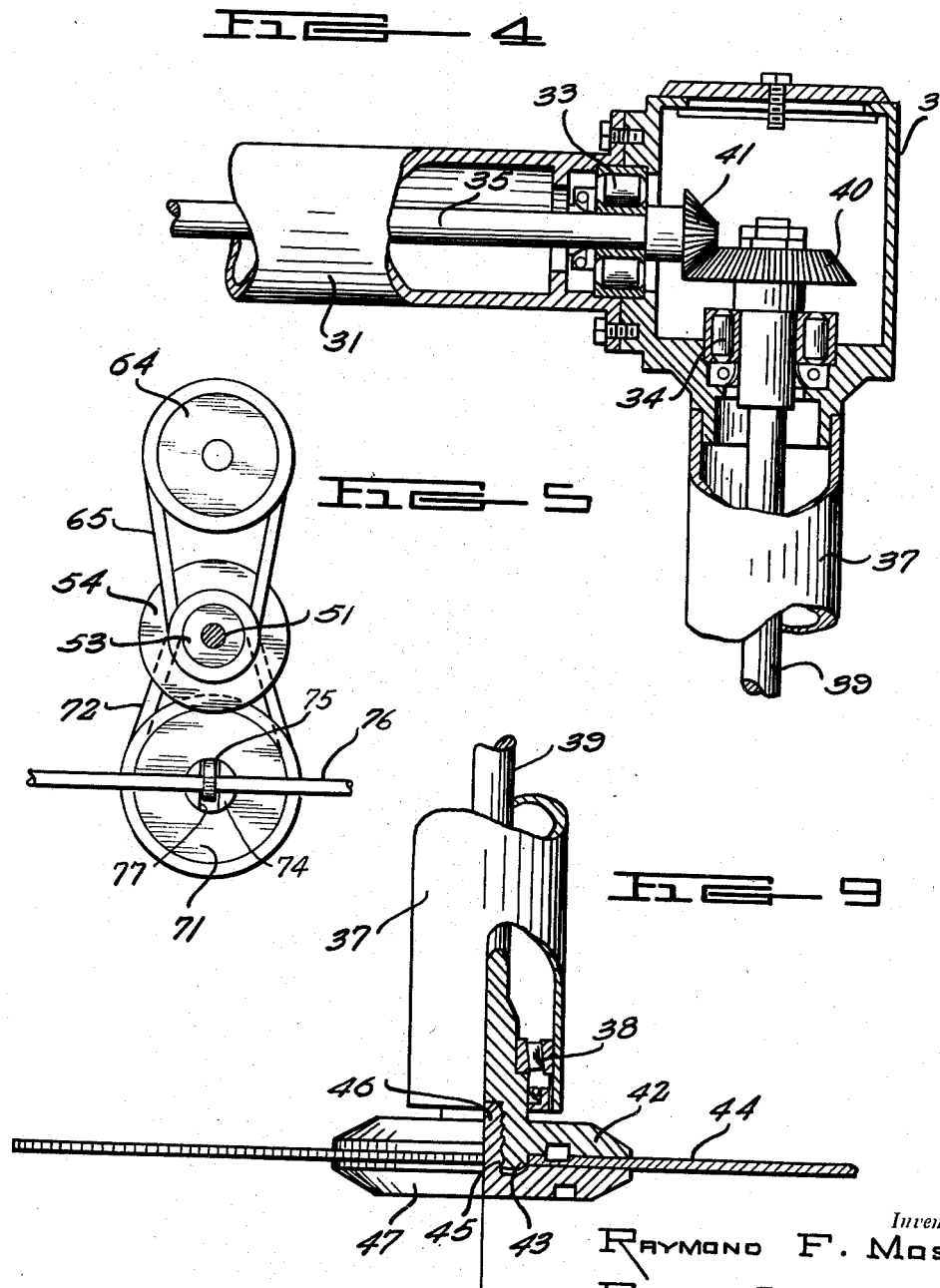

Oct. 3, 1950 R. F. MOSS ET AL 2,524,466
SELF-PROPELLED TWO-WHEEL TIMBER-SAWING MACHINE
Filed Sept. 23, 1946 4 Sheets-Sheet 4
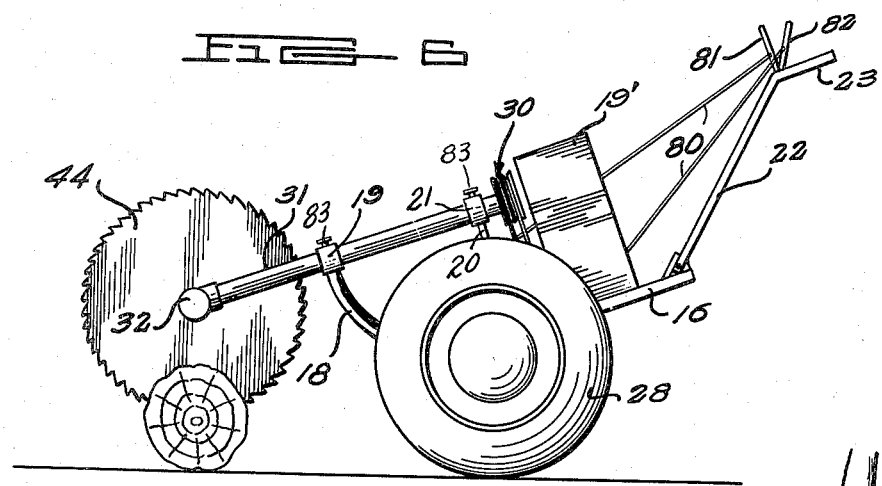
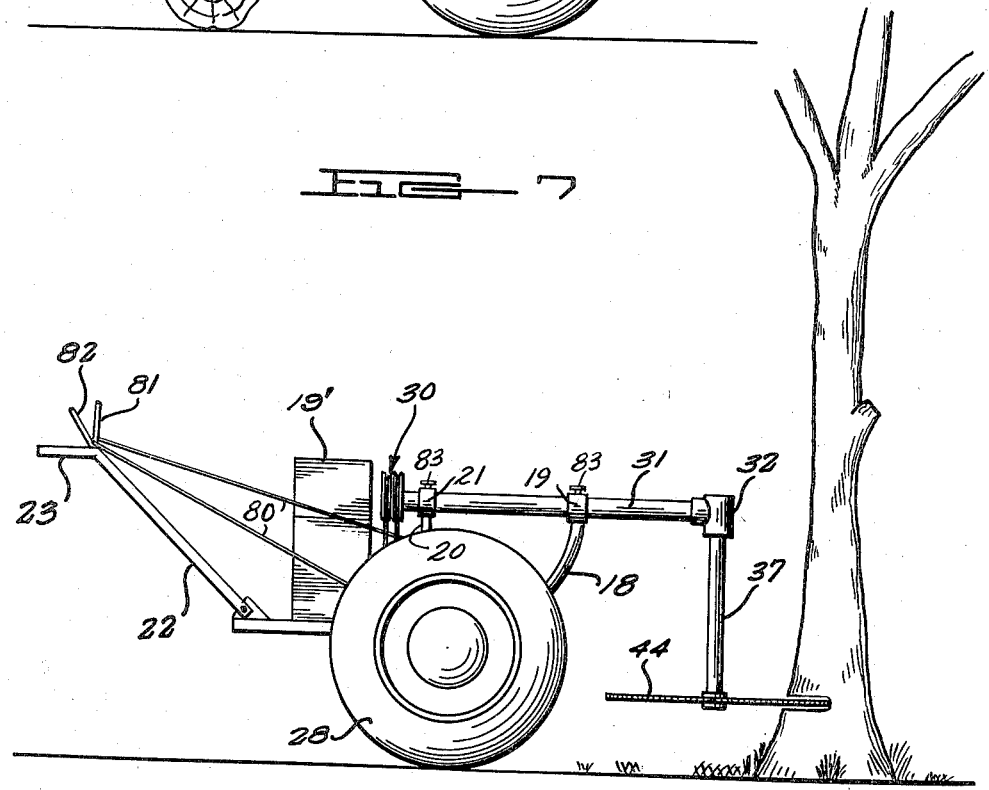
Inventors
RAYMOND F. MOSS
FLOYD J. MILLER
By Clarence A. O'Brien
and Harvey B. Jacobson
Attorneys Patented Oct. 3, 1950

2,524,466

UNITED STATES PATENT OFFICE 2,524,466

SELF-PROPELLED TWO-WHEEL TIMBER-SAWING MACHINE

Raymond F. Moss, Calera, and Floyd J. Miller, Durant, Okla.

Application September 23, 1946, Serial No. 698,696

1 Claim. (Cl. 143—43)

This invention relates to a combination farm implement and has for its primary object to aid the cultivation of the soil, to cut weeds and the like and also to cut shrubbery, trees and fallen logs.

Another object is to transmit power to traction wheels and to the cutter simultaneously or selectively according to the requirements.

The above and other objects may be attained by employing this invention which embodies among its features a frame, a prime mover carried by the frame, a pair of traction wheels supporting the frame, a cutting unit carried by the frame and means selectively to establish driving connection between the prime mover and the traction wheels and the prime mover and the cutting unit.

Other features include a prime mover having a drive shaft, a driven pulley mounted to rotate about said drive shaft adjacent the prime mover, a clutch element on the end of the pulley opposite the prime mover, a sleeve splined to the drive shaft to rotate therewith but move longitudinally thereof, a clutch member on one end of the sleeve for cooperation with the clutch member on the pulley, a pressure member on the sleeve at the end opposite the clutch member, a compression coil spring bearing on the end of the drive shaft and the pressure member, and a manually actuated eccentric operating against the pressure member to regulate the pressure exerted by the clutch member on the sleeve against the clutch member on the pulley.

In the drawings:

Figure 1 is a plan view of a farm implement embodying the features of this invention.

Figure 2 is a side view of Figure 1.

Figure 3 is an enlarged fragmentary view of the power transmission unit of the device, certain portions being shown in section more clearly to illustrate the details of construction.

Figure 4 is an enlarged fragmentary view partially in section of a portion of the power transmitting elements for the cutting device.

Figure 5 is an end view on a reduced scale of Figure 3.

Figure 6 is a side view of the device equipped to cut a fallen log.

Figure 7 illustrates the device in use in cutting a tree.

Figure 8 is a plan view of a grass cutter and guard adapted to be employed in connection with the implement, and Figure 9 is an enlarged fragmentary view partially in section of the cutter blade supporting arbor.

Referring to the drawings in detail, this improved implement designated generally 15 comprises a frame 16 formed of spaced parallel side bars which extend rearwardly from a suitable drive axle 17 and are provided at their forward ends with upwardly and inwardly converging extensions 18 which support at their upper ends a sleeve 19. Raising from the frame 16 adjacent the junction of the side bars with the upwardly converging extensions 18 are converging columns 20 which support at their upper ends a sleeve 21 which aligns axially with the sleeve 19, and the axis of these sleeves lies parallel with the longitudinal axis of the frame 16. Mounted on the frame 16 to the rear of the axle 17 and the converging arms or columns 20 is a prime mover 19' which may take the form of an internal combustion engine of any suitable design and capacity. Rising upwardly from the rear end of the frame 15 an inclined rearwardly with relation thereto are handle bars 22 terminating at their upper rear ends in hand grips 23. Extending transversely between the handle bars 22 adjacent their junctions with the grips 23 is a cross bar 24 which serves to hold the handle bars in spaced parallel relation. Depending from the frame 16 at its rear end is an angle bracket 25 formed with divergent rearwardlly extending legs 26 upon which are adapted to be supported suitable earth working implements 27 such as plows or cultivator teeth. The drive axle 17 carries at opposite ends traction wheels 28, and fixed to the axle intermediate its ends is a worm gear 29' which is adapted to be driven by a worm 29 from the prime mover 19' through the control mechanism designated generally 30 to be more fully hereinafter described.

Rotatably supported in the sleeves 19 and 21 is a tubular housing 31 carrying at its forward end a suitable gear case 32 in which roller bearings 33 and 34 are supported in any suitable manner. See Figure 4. A drive shaft 35 extends through the tubular housing 31 and its rear end is supported in roller bearings 36 fitted in the housing 31 adjacent its rear end. See Figure 3. The drive shaft 35 extends slightly beyond the rear end of the housing 31 for connection with the power transmitting unit 30 previously referred to. Extending laterally from the gear case 32 is a tubular arm 37 supporting adjacent its remote from the gear case end suitable roller bearings 38 (Figure 9) which align axially with the roller bearings 34 and support a tool operating shaft 39. One end of the tool operating shaft 39 enters the gear case 32 and is provided with a beveled gear 40 which has meshing engagement with a bevel pinion 41 carried by the shaft 35, so that when the shaft 35 is driven the shaft 39 will be rotated. The end of the shaft 39 remote from the gear case 32 terminates in a flange 42 provided on its lower face with a boss 43 which serves a centering device for a suitable cutting tool 44 such as a saw blade, grass cutter or the like. Opening into the lower end of the shaft 39 is an internally screw threaded socket 45 which is adapted to receive the threaded shank 46 of a clamping disk 47 by means of which the tool 44 may be removably clamped against the flange 42 to insure rotation of the tool in unison with the shaft 39. The tool so clamped may take the form of a saw blade, or a rotary grass cutter 48 (Figure 8), at least a portion of which is enclosed in a guard 49 which is adapted to be clamped to the housing 37 adjacent the end thereof remote from the gear case 32 by means of a compression clamp 50 carried thereby.

In order to establish driving connection between the traction wheels 28 and the prime mover, and the drive shaft 35 and the prime mover, we employ the transmission unit 30 which is best illustrated in Figure 3. In this type of transmission unit we mount on the drive shaft 51 of the prime mover a suitable anti-friction bearing 52 upon which is supported for rotation independently of the shaft 51 a drive pulley 53. The end of the drive pulley 53 is provided with a cone shaped clutch member 54, and splined to the outer end of the shaft 51 as at 55 is a sleeve 56. This sleeve carries at the end nearest the prime mover the male element 57 of a cone clutch to which is attached a suitable clutch facing 58 which is adapted to engage a clutch element 54 in order to establish driving connection between the sleeve 56 and the pulley 53. Formed adjacent the end of the sleeve opposite the clutch member 57 is a grooved pulley 59, the purpose of which will be more fully hereinafter explained. Seated in the end of the sleeve 56 carrying the pulley 59 is a thrust bearing 60 against which a pressure member 61 bears. A compression coil spring 62 is contained within the sleeve 56 and one end thereof bears on the end of the shaft 51, while its opposite end bears against the pressure member 61 so as normally to urge the pressure member away from the sleeve 56 and hence avoid positive engagement of the clutch members 54 and 57. Mounted for rotation with a shaft 62 which extends transversely of the frame 16 in advance of the transmission unit 30 is an eccentric 63 which bears against the pressure member 61 so that when the shaft 62 is rotated the clutch member 57 will be urged into engagement with the clutch member 54 in order to drive the pulley 53.

Mounted on the end of the shaft 35 which projects beyond the housing 31 is a drive pulley 64 which has driving connection with the pulley 53 through the medium of drive belts 65. It will thus be seen that as the sleeve 56 is advanced toward the pulley 53 the clutch members 54 and 57 will be brought into engagement, thus driving the pulley 53 and transmitting the power to the shaft 35. On the other hand when the eccentric 63 is moved in the opposite direction the spring 62 will urge the pressure member 61 away from the sleeve 56 so that slippage will be established between the clutch members 54 and 57.

The worm 29 previously referred to is attached to one end of a drive shaft which extends parallel to the shaft 35 along an axis directly beneath the said shaft, and keyed or otherwise secured to the shaft 66 as at 67 is a hub 68 carrying a clutch disk 69. A suitable clutch facing 70 is carried on the disk 69, and slidably supported on the end of the shaft 66 adjacent the clutch face 70 is a drive pulley 71 having driving connection with the pulley 59 through the medium of drive belts 72. This pulley 71 has recessed in the end opposite that facing the clutch face 70 a suitable thrust bearing of the anti-friction type designated 73, and fitted in the bearing 73 is a pressure member 74 which is adapted to be engaged by an eccentric 75 mounted on a shaft 76 which extends parallel with the shaft 62. Both pressure members 61 and 74 are provided in outer ends with transversely extending grooves 77 which are adapted to receive the edges of their respective eccentrics. Carried by the shaft 62 is a lever arm 78, and a similar lever arm 79 is carried by the shaft 76. These lever arms are connected through suitable linkage 80 with hand levers 81 and 82 which are pivotally mounted on the cross member 24 within easy reach of the grips 23 so that the operator may have the device under instantaneous control at all times.

The housing 31 is rotatably supported in the sleeves 19 and 21 so that the arm 37 may be turned into various positions about the axis of the tubular housing 31 and the shaft 35. Suitable set screws 83 extend radially into the sleeves 19 and 21 in order to hold the arm 37 in the desired position.

In use it will be understood that the end of the shaft 39 is equipped with the desired tool 44, for instance a circular saw and the housing 31 rotated about its longitudinal axis to bring the tool to the desired position for instance in cutting a tree as illustrated in Figure 7 the saw 44 will rotate about a vertical axis, whereas in cutting a log as in Figure 6, the saw will be turned to rotate about a horizontal axis. Upon manipulating the handle levers 81 and 82 it is obvious that the saw may be set into operation, and the traction wheels may be driven to advance the saw toward the material to be cut. Should it be desired to cut a fallen log it is obvious that the arm 37 may be turned to rotate about a horizontal axis and by tipping the frame, and disengaging the clutch which operates the traction wheels it is obvious that the saw may be advanced through the fallen log at the desired rate of speed. When it is desired to use the device as a mower the cutter 48 is substituted for the saw 44 with the guard 49 clamped in place by the clamp 50 at the lower end of the arm 37, and by manipulating the transmission unit 30 the rapidity of rotation of the cutter may be governed as well as the advance of the implement over the surface being traversed. In certain instances it is desirable to utilize the device as a power plow or cultivator, in which event the bracket 25 is affixed to the frame 16 and suitable implements 27 are attached to the bracket, whereupon the clutch for driving the traction wheels 28 may be manipulated to establish driving connection between the prime mover 19' and the wheels so that the device then becomes a power cultivator.

While in the foregoing there has been shown and described the preferred embodiment of this invention it is to be understood that minor changes in the details of construction, combination and arrangement of parts may be resorted to without departing from the spirit and scope of the invention as claimed.

What we claim:

In a combination farm implement of the type which is steered by a walking attendant, a frame, a drive axle mounted on said frame to rotate about an axis which extends transversely of said frame, traction wheels on said axle, a tubular housing carried by the frame above the level thereof to rotate about an axis which lies perpendicular to a vertical plane coincident with the axis of the drive axle, said tubular housing overhanging the forward end of said frame, a prime mover mounted on said frame to the rear of the drive axle with its drive shaft lying parallel with and below the tubular housing, a tool drive shaft mounted in the tubular housing to rotate about the longitudinal axis thereof, a drive pulley on said tool drive shaft, a traction drive shaft mounted on the frame to rotate below the tool drive shaft in parallel relation therewith, means establishing driving connection between the traction drive shaft and the axle, a traction drive pulley mounted on the traction drive shaft to rotate thereabout, friction means releasably to establish driving connection between the traction drive pulley and the traction drive shaft, a sleeve splined on the drive shaft of the prime mover, a drive pulley mounted on the drive shaft of the prime mover adjacent the prime mover, friction means releasably establishing driving connection between the sleeve and the drive pulley adjacent the prime mover, an endless belt establishing driving connection between the drive pulley adjacent the prime mover and the drive pulley on the tool drive shaft and an endless belt establishing driving connection between the sleeve and the traction drive pulley.

RAYMOND F. MOSS.
FLOYD J. MILLER.

REFERENCES CITED

The following references are of record in the file of this patent:

UNITED STATES PATENTS

| Number | Name | Date |
|---|---|---|
| 1,454,901 | McArthur | May 15, 1923 |
| 1,601,859 | Johnson | Oct. 5, 1926 |
| 1,891,526 | Dupuis | Dec. 20, 1932 |
| 2,066,174 | Cregier | Dec. 29, 1936 |
| 2,412,704 | Jaques | Dec. 17, 1946 |

FOREIGN PATENTS

| Number | Country | Date |
|---|---|---|
| 122,266 | Great Britain | Jan. 23, 1919 |
| 620,956 | France | Jan. 25, 1927 |
| 118,961 | Australia | Sept. 12, 1944 |